(12) United States Patent
Rytlewski et al.

(10) Patent No.: US 6,231,265 B1
(45) Date of Patent: May 15, 2001

(54) SELF-ALIGNING SUBSEA LATCH MECHANISM

(75) Inventors: Gary L. Rytlewski, League City; John R. Meijer; Dinesh R. Patel, both of Sugar Land, all of TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/258,679

(22) Filed: Feb. 26, 1999

(51) Int. Cl.$^7$ ...................................................... F16B 21/00
(52) U.S. Cl. ..................... 403/322.1; 403/319; 403/328; 403/332; 403/334; 403/355; 403/409.1; 403/13; 403/14; 166/341; 166/342; 166/344; 166/345; 166/359
(58) Field of Search ................................ 403/322.1, 319, 403/328, 332, 333, 334, 355, 409.1, 13, 14; 166/341, 342, 344, 345, 359

(56) References Cited

U.S. PATENT DOCUMENTS

| | | | |
|---|---|---|---|
| 2,471,759 | * 5/1949 | Lowrey | 284/110 |
| 3,105,035 | * 9/1963 | Weems | 284/24 |
| 3,353,595 | * 11/1967 | Nelson et al. | 166/341 |
| 3,741,296 | * 6/1973 | Murman et al. | 166/341 |
| 4,095,649 | * 6/1978 | Chateau et al. | 166/341 |
| 4,209,891 | * 7/1980 | Lambe et al. | 166/341 X |
| 4,408,929 | * 10/1983 | Baugh | 166/341 X |
| 4,478,287 | * 10/1984 | Hynes et al. | 166/341 |
| 4,894,043 | * 1/1990 | Nixon, Jr. | 403/2 X |
| 5,145,006 | * 9/1992 | June | 166/341 |
| 5,238,343 | * 8/1993 | Scherrer | 403/371 X |
| 5,975,210 | * 11/1999 | Wilkins et al. | 166/341 |
| 5,980,099 | * 11/1999 | Soon | 403/322.1 X |
| 6,089,321 | * 7/2000 | Morrill | 166/341 |

FOREIGN PATENT DOCUMENTS

2165284 * 4/1986 (GB) .................................. 166/341

* cited by examiner

Primary Examiner—Lynne H. Browne
Assistant Examiner—Ernesto Garcia
(74) Attorney, Agent, or Firm—Trop, Pruner & Hu P.C.

(57) ABSTRACT

A latching assembly includes a first mating portion and a second mating portion disposed adjacent and rotationally restrained relative to the first mating portion. A first cam member having a first cam profile is mounted on the first mating portion. A second cam member having a second cam profile is mounted on the second mating portion. The second cam profile is adapted to inter-fit with the first cam profile. Torque induced by the cam members when the cam profiles are engaging rotates the first cam member until the first cam profile is inter-fitted with the second cam profile.

11 Claims, 4 Drawing Sheets

SELF-ALIGNING SUBSEA LATCH MECHANISM

BACKGROUND OF THE INVENTION

1. Technical Field

The invention relates generally to offshore systems employed for conducting petroleum-related operations, such as drilling and testing productivity of a well, producing fluids from a reservoir, and so forth. More specifically, the invention relates to an apparatus for connecting retrievable subsea components of the offshore system.

2. Background Art

Offshore systems that are adapted for conducting petroleum-related operations in relatively deep water generally comprise a floating vessel, a marine riser, a subsea wellhead, and a subsea blowout preventer stack. The wellhead is positioned below the floating vessel and secured to the seafloor. The blowout preventer stack is mounted on the wellhead and connected to the floating vessel by the marine riser. The marine riser provides a conduit through which tools and fluid can be communicated between the floating vessel and one or more wells beneath the wellhead. Typically, a dynamic positioning system which comprises active means of monitoring position combined with thruster control is used to keep the floating vessel on station. However, a dynamically positioned vessel is subject to drive-off, i.e., rapid evacuation from the operation site, at all times. A drive-off situation may be caused by a number of reasons, some of which include problems with the active means of monitoring position, failure of thrusters, power shutdown on the vessel, storm, and ocean current anomalies.

In a drive-off situation, the marine riser must be disconnected from the blowout preventer stack to permit the vessel to evacuate the operation site. However, before disconnecting the marine riser, the well must be controlled and prepared for abandonment. In some offshore systems, subsea intervention trees, also called subsea internal trees, provide the vessel with the ability to control and quickly disconnect from the well. The subsea intervention tree is usually secured in the blowout preventer stack and includes a valve assembly and a latch assembly. The valve assembly includes one or more valves which may be operated to control and seal the well. The latch assembly includes a lower mating portion and an upper mating portion. The lower mating portion is attached to the valve assembly and the upper mating portion is coupled to a landing string. When the mating portions are connected, the subsea intervention tree can be lowered into the blowout preventer stack on the landing string. The upper mating portion can be released from the lower mating portion to allow the landing string to be retrieved from the blowout preventer stack and pulled to a height which will permit the vessel to leave the operation site safely.

After the emergency event, the vessel may return to the operation site and again re-connect to the well. The landing string with the upper mating portion can be lowered into the blowout preventer stack to allow the upper mating portion to re-connect to the lower mating portion. The upper mating portion typically includes hydraulic connectors which are arranged in a certain order and which must be properly connected to similarly arranged hydraulic connectors on the lower mating portion. To allow proper connection of the connectors, alignment devices are generally provided on the mating portions. These alignment devices will not allow the upper mating portion to contact the lower mating portion until the upper mating portion achieves a certain positional alignment with respect to the lower mating portion. The landing string is usually rotated to place the upper mating position in the desired positional alignment with respect to the lower mating portion. However, in deep water, the weight and length of the landing string make it difficult to properly align the mating portions by rotating the landing string. Therefore, it is desirable to have a latch mechanism with mating portions that can re-connect without the need to manipulate the landing string to achieve a certain positional alignment between the mating portions.

SUMMARY OF THE INVENTION

In general, in one aspect, a latching assembly comprises a first mating portion and a second mating portion disposed adjacent and rotationally restrained relative to the first mating portion. A first cam member having a first cam profile is mounted on the first mating portion, and a second cam member having a second cam profile is mounted on the second mating portion. The second cam profile is adapted to inter-fit with the first cam profile. Torque induced by the cam members when the cam profiles are engaging rotates the first cam member until the first cam profile is inter-fitted with the second cam profile.

Other aspects and advantages of the invention will be apparent from the following description and the appended claims.

DETAILED DESCRIPTION

Figure 1:
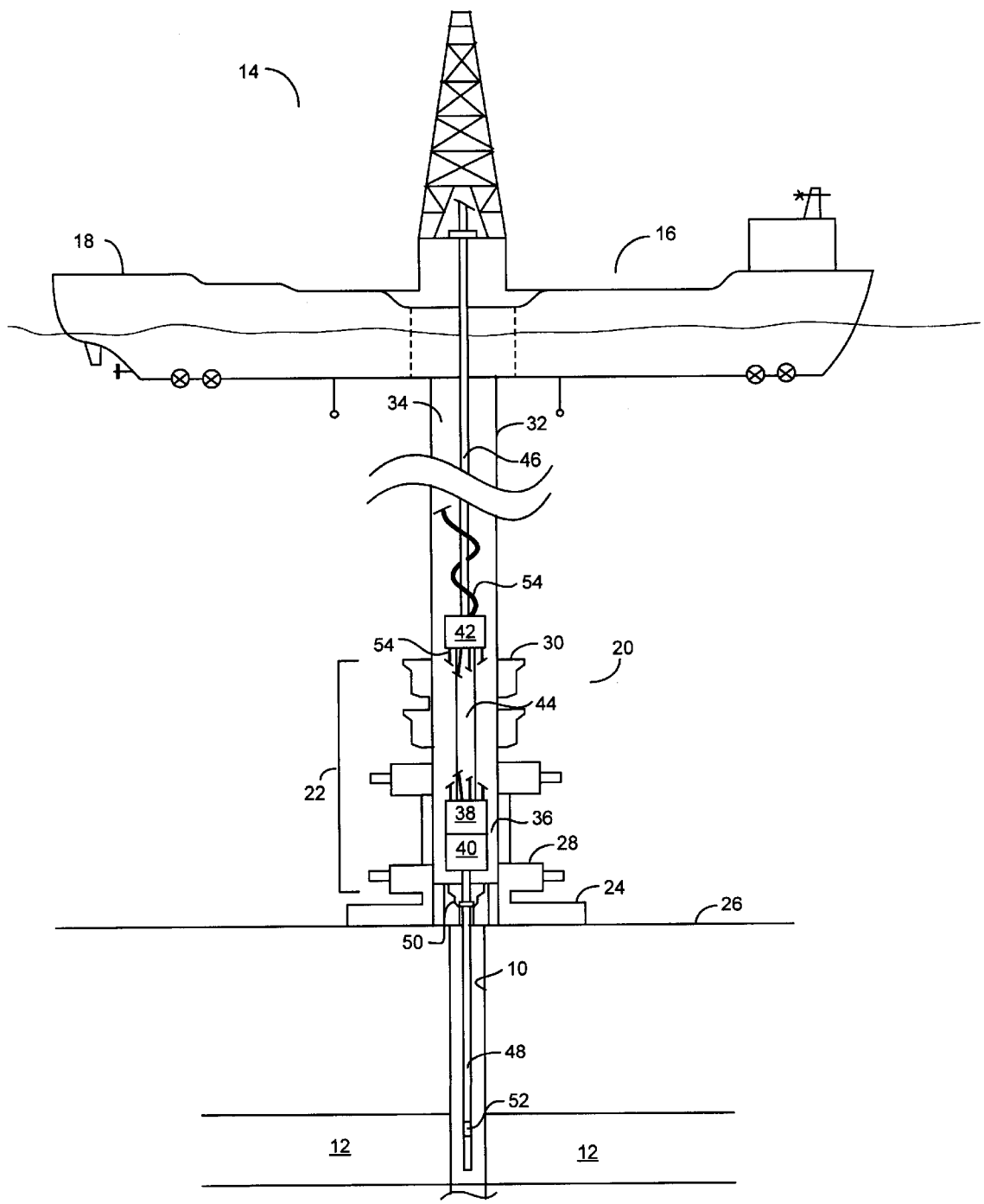
FIG. 1 illustrates an offshore system with a subsea intervention tree secured in a blowout preventer stack.

Referring to the drawings wherein like characters are used for like parts throughout the several views, FIG. 1 depicts a well 10 which traverses a fluid reservoir 12 and an offshore system 14 suitable for testing productivity of the well 10. The offshore system 14 comprises a surface system 16, which includes a production vessel 18, and a subsea system 20, which includes a blowout preventer stack 22 and a subsea wellhead 24. The subsea wellhead 24 is fixed to the seafloor 26, and the blowout preventer stack 22 is mounted on the subsea wellhead 24. The blowout preventer stack 22 includes ram preventers 28 and annular preventers 30 which may be operated to seal and contain pressure in the well 10. A marine riser 32 connects the blowout preventer stack 22 to the vessel 18 and provides a passage 34 through which tools and fluid can be communicated between the vessel 18 and the well 10.

The subsea system 20 further comprises a subsea intervention tree 36 which is positioned in the blowout preventer stack 22. The subsea intervention tree 36 includes an upper subassembly 38 and a lower subassembly 40. The upper subassembly 38 is coupled to a connector assembly 42 by a mandrel 44, and the connector assembly 42 is in turn coupled to an upper pipe string or landing string 46 which extends upwardly to the vessel 18. The lower subassembly 40 is coupled to a lower pipe string 48 which is suspended in the well 10 by a fluted hanger 50. The subsea intervention tree 36 and the mandrel 44 have bores (not shown) which allow fluid communication between the upper pipe string 46 and the lower pipe string 48. Fluid may flow from the reservoir 12, through the pipe strings 46 and 48, to the vessel 18. The lower pipe string 48 is equipped with a test device 52 which is responsive to fluid properties and/or other reservoir parameters.

The lower subassembly 40 includes one or more valves (not shown) which may be actuated to permit or prevent fluid communication between the pipe strings 46 and 48. In the event that the valves in the lower subassembly 40 fails, the ram preventers 28 in the blowout preventer stack 22 may be operated to shear the mandrel 44 and seal the well 10. The upper subassembly 38 is releasably connected to the lower subassembly 40 by a latch mechanism which includes an upper cam 53 (shown in FIG. 2A) and a lower cam 55 (shown in FIG. 3A). When the upper subassembly 38 is connected to the lower subassembly 40 as shown, control lines 54 from the vessel 18 are routed through the connector assembly 42 and upper subassembly 38 to the lower subassembly 40. The control lines 54 provide the fluid pressure necessary to operate the valves in the lower subassembly 40.

Figure 2A:
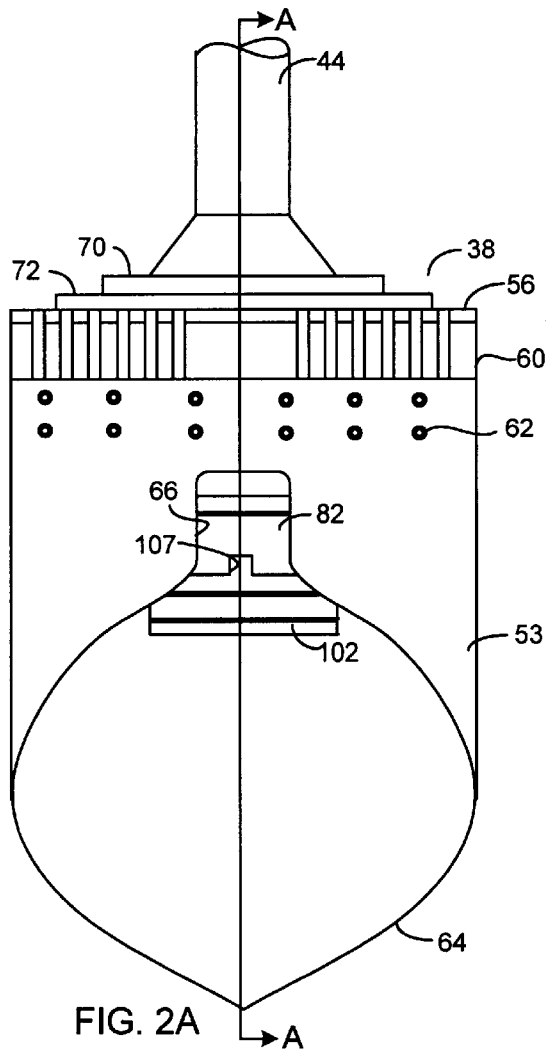
FIG. 2A is an elevation view of the upper subassembly of the subsea intervention tree shown in FIG. 1.
Figure 2B:
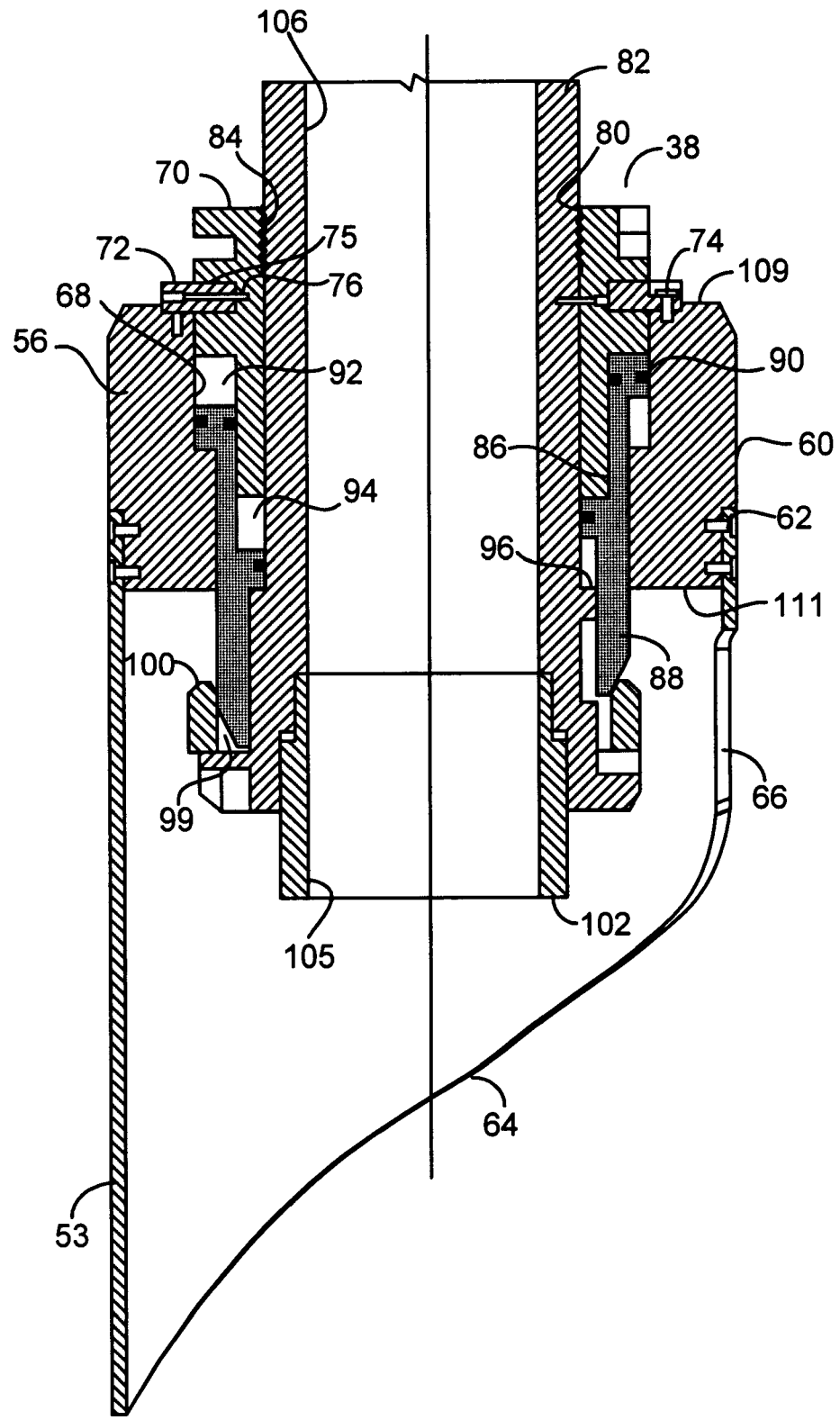
FIG. 2B is a cross section of the upper subassembly shown in FIG. 2A along line A—A, with the left half showing a locked position and the right half showing a released position.

Referring to FIGS. 2A and 2B, the upper subassembly 38 includes a housing body 56. The upper cam 53 is secured to the outer surface 60 of the housing body 56 by fasteners, e.g., bolts 62. The upper cam 53 has a cam profile which includes a helical profile 64 that terminates in a slot 66. The housing body 56 is provided with a bore 68. A piston cap 70 is disposed in the bore 68 and secured to the housing body 56 by a split ring 72. As shown, one end of the split ring 72 is secured to the housing body 56 by fasteners, e.g., screws 74, and another end of the split ring 72 is disposed in a recess 75 on the piston cap 70. The split ring 72 is secured to the piston cap 70 by shear pins 76 and may spin freely in the recess 75 when the shear pins 76 are sheared.

The piston cap 70 has a bore 80 for receiving a lower portion 82 of the mandrel 44 (shown in FIG. 1). The lower mandrel portion 82 is secured to the piston cap 70 by a threaded connection 84 or by other suitable means. The housing body 56, the piston cap 70, and the lower mandrel portion 82 define a space 86 for receiving a piston 88. Seals 90 are provided between the piston 88 and the housing body 56, the piston cap 70, and the lower mandrel portion 82 such that sealed chambers 92 and 94 are defined within the space 86. The piston 88 is arranged to reciprocate within the space 86 in response to differences in fluid pressures in the sealed chambers 92 and 94. As illustrated in the right half of the drawing of FIG. 2B, the piston cap 70 limits the upward movement of the piston 88. As illustrated in the left half of the drawing of FIG. 2B, a shoulder 96 on the lower mandrel portion 82 limits the downward movement of the piston 88.

A lock ring 100 is secured to the lower mandrel portion 82. When the piston 88 rests on the shoulder 96, as illustrated in the left half of the drawing of FIG. 2B, the lower end of the piston 88 is received in a recess 99 between the lock ring 100 and the lower mandrel portion 82. A seal sub 102 is secured to the lower end of the lower mandrel portion 82. The seal sub 102 has a bore 105 that is co-extensive with a bore 106 of the lower mandrel portion 82. The bore 106 is in fluid communication with the upper pipe string 46 (shown in FIG. 1). Slots 107 (shown in FIG. 2A) are provided along a circumference of the lower mandrel portion 82. Hydraulic lines (not shown) run from the upper end 109 of the housing body 56 to the lower end 111. The hydraulic lines are adapted to be connected to the control lines 54 (shown in FIG. 1).

Figure 3A:
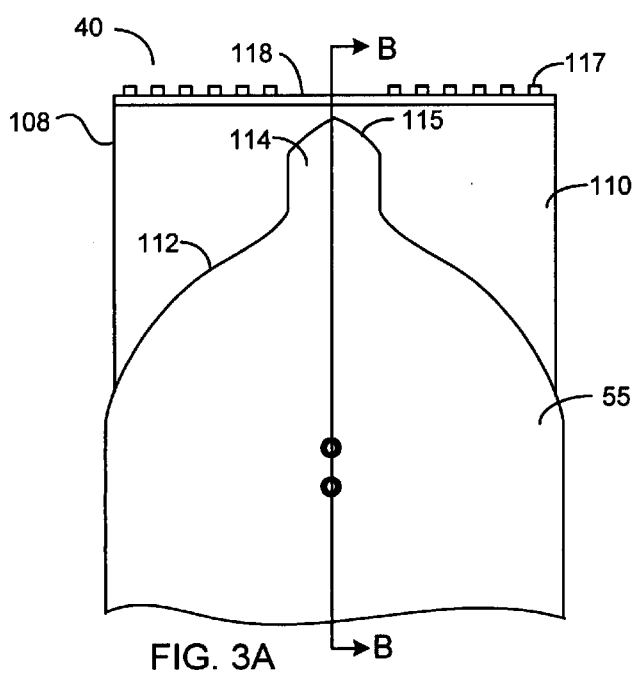
FIG. 3A is an elevation view of the lower subassembly of the subsea intervention tree shown in FIG. 1.
Figure 3B:
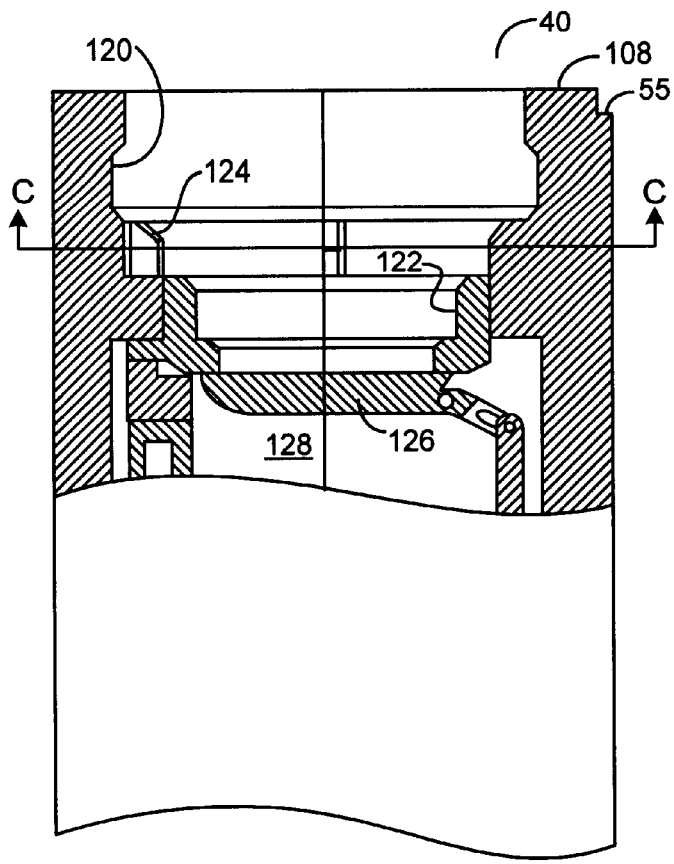
FIG. 3B is a partial cross section of the lower subassembly shown in FIG. 3A along line B—B.
Figure 3C:
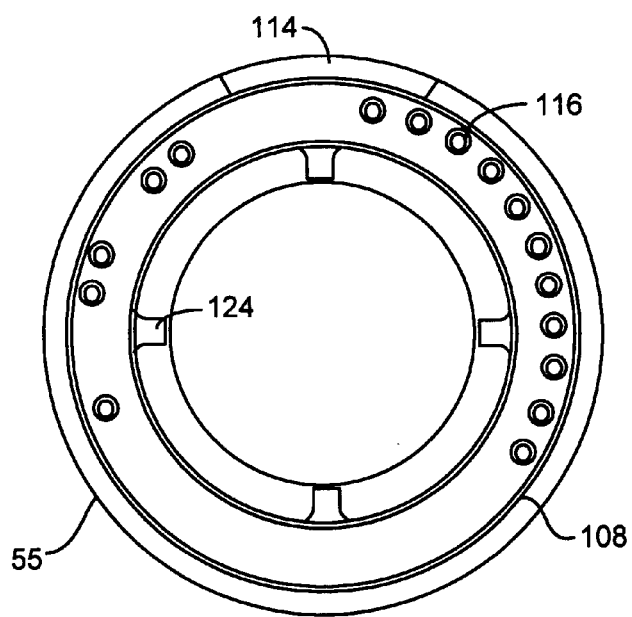
FIG. 3C is a cross section of the lower subassembly shown in FIG. 3B along line C—C.

Referring to FIGS. 3A–3C, the lower subassembly 40 includes a housing body 108. The lower cam 55 is integrated with the outer surface 110 of the housing body 108. In the illustrated embodiment, the lower cam 55 has a cam profile which includes a helical profile 112 that terminates in a key 114. The helical profile 112 and the key 114 are adapted to inter-fit with the helical profile 64 and the slot 66, respectively, of the upper cam 53 (shown in FIGS. 2A and 2B). In an alternate embodiment, multiple keys, similar to key 114, may be distributed along the helical profile 112, and multiple slots, similar to slot 66, may be provided on the helical profile 64 to receive the keys.

The key 114 is provided with a helical shoulder 115. When the helical profile 64 contacts the helical shoulder 115 or helical profile 112, induced torque by the upper cam 53 and the lower cam 55 rotates the upper cam 53 and the housing body 56 (shown in FIGS. 2A and 2B) about the lower mandrel portion 82 until the slot 66 engages the key 114. Friction between the helical profiles 64 and 112 as the upper cam 53 rotates relative to the lower cam 55 can be kept to a minimum by coating the helical profiles 64 and 112 with Teflon or other material that has a low coefficient of friction. Alternately, a ball bearing may be provided between the helical profiles. Hydraulic lines 116 (shown in FIG. 3C) are provided in the housing body 108. When the upper cam 53 and the lower cam 55 are inter-fitted, the hydraulic lines 116 are connected to the hydraulic lines in the housing body 56 (shown in FIG. 2A) via hydraulic connectors 117 on the upper end 118 of the housing body 108.

The housing body 108 includes a lock ring profile 120 (shown in FIG. 3B) which is adapted to engage the lock ring 100 on the lower mandrel portion 82 and a seal bore 122 which is adapted to receive the seal sub 102 on the lower mandrel portion 82. The housing body 108 also include torsional keys 124 which are adapted to interlock with the slots 107 on the lower mandrel portion 82, thereby securing the upper subassembly 38 to the lower subassembly 40. A flapper valve 126 is arranged in the housing body 108, between the seal bore 122 and a lower bore 128 in the housing body 108. The flapper valve 126 may be operated to allow or prevent fluid communication between the bores 122 and 128. The bore 128 is in fluid communication with the lower pipe string 48 (shown in FIG. 1).

In operation, the subsea intervention tree 36 is landed in the blowout preventer stack 22 as shown in FIG. 1. The flapper valve 126 is normally open to allow fluid to flow from the reservoir 12, through the lower pipe string 48 and the upper pipe string 46, to the vessel 18. In the event of an emergency situation, the flapper valve 126 may be closed to prevent fluid communication between the lower pipe string 48 and the upper pipe string 46. If the emergency situation calls for abandonment of the well, the upper subassembly 38 is released from the lower subassembly 40 and the upper pipe string 46 is pulled to the vessel 18. The marine riser 32 is then released from the blowout preventer stack 22 and pulled to a height which will allow the vessel 18 to move away from the well site.

After the emergency situation, the vessel 18 can return to the well site and the marine riser 32 can be re-connected to the blowout preventer stack 22. Once the marine riser 32 is connected to the blowout preventer stack 22, the upper subassembly 38 may be lowered to the lower subassembly 40 on the upper pipe string 48. As the upper subassembly 38 is lowered toward the lower subassembly 40, the shear pins 76 prevent the housing body 56 from rotating about the lower mandrel portion 82. If the housing body 56 rotates about the lower mandrel portion 82 as the upper subassembly 38 is lowered toward the lower subassembly 40, the control lines 54 will wrap around the mandrel 44 and may break. The upper subassembly 38 is lowered until the helical profile 64 on the upper cam 53 contacts the helical shoulder 115 or helical profile 112 on the lower cam 55. When the helical profile 64 contacts the helical shoulder 115 or helical profile 112, the upper cam 53 tends to rotate relative to the lower cam 55. However, the upper cam 53 will not rotate relative to the lower cam 55 until the torque induced by the cams is sufficient to shear the shear pins 76.

Of course, there are other means of preventing the housing body 56 from rotating about the lower mandrel portion 82 as the upper subassembly 38 is lowered toward the lower subassembly 40. A collet or just friction may be used in place of the shear pins 76 to prevent the housing body 56 from rotating until a minimum torque is achieved. When the shear pins 76 are sheared, the housing body 56 rotates freely about the lower mandrel portion 82 and the upper cam 53 rotates freely relative to the lower cam 55. As the upper cam 53 rotates, the helical profile 64 rides on the helical shoulder 115 until the key 114 is received in the slot 66. The hydraulic lines in the housing bodies 56 and 108 are automatically aligned and connected when the key 114 is received in the slot 66.

The upper subassembly 38 is secured to the lower subassembly 40 by rotating the mandrel 44 until the slots 107 on the lower mandrel portion 82 interlock with the torsional keys 124 in the housing body 108. When the torsional keys 124 engage the slots 107, fluid pressure differential may be created between the sealed chambers 92 and 94 to move the piston 88 downwardly. When the piston 88 rests on the shoulder 96 of the lower mandrel portion 82, the lower end of the piston 88 is forced into the recess 99 between the mandrel portion 82 and the lock ring 100 and the lock ring 100 is radially expanded to engage the lock ring profile 120. To unlatch the upper subassembly 38 from the lower subassembly 40, fluid pressure differential is created between the sealed chambers 92 and 94 to move the piston 88 upwardly. When the piston 88 moves upwardly, the lock ring 100 is released from the lock ring profile 120. The mandrel 44 is then lifted to release the torsional keys 124 from the slots 107, allowing the upper subassembly 38 to be lifted from the lower subassembly 40.

The invention provides advantages. First, torque induced by the upper cam 53 and the lower cam 55 when the cam profiles are engaging rotates the upper subassembly 38 relative to the upper pipe string or landing string 46. As the upper cam 53 rotates, the slot 66 on the upper cam 55 and the key 114 on the lower cam 55 self-align without manipulating the landing string 46 to place the upper subassembly 38 in a certain positional alignment with respect to the lower subassembly 40. Second, when the key 114 is received in the slot 66, the hydraulic lines in the subassemblies 38 and 40 are automatically aligned and connected. Finally, the upper cam 53 and the lower cam 55 can be used with any subassemblies that need to be releasably connected together and where proper alignment of the subassemblies is critical.

While the invention has been described with respect to a limited number of embodiments, those skilled in the art will appreciate numerous variations therefrom without departing from the spirit and scope of the invention. For example, the upper cam 53 and the lower cam 55 can be interchanged such that the helical profile 64 with the slot 66 is provided on the lower subassembly 40 and the helical profile 112 with the key 114 is provided on the upper subassembly 38. A removable sleeve may be provided on the upper cam 53 to guide the upper cam 53 to the lower cam 55. The upper cam 53 and the housing body 56 can be coupled to the piston cap 70 or the lower mandrel portion 82 in any suitable manner as long as the upper cam 53 and the housing body 56 is free to rotate relative to the lower cam 55. One suitable manner may be providing bearings between the piston cap 70 and the housing body 56 so that the housing body 56 is free to rotate about the lower mandrel portion 82.

What is claimed is:

1. A latching assembly, comprising:
   a first mating portion;
   a second mating portion;
   a first cam member mounted on the first mating portion, the first cam member having a first profile;
   a second cam member mounted on the second mating portion, the second cam member having a second different profile adapted to inter-fit with the first profile;
   the first and second profiles being engageable to rotate the first and second cam members to enable inter-fitting of the first and second profiles; and
   a releasable lock mechanism provided in the first mating portion adapted to engage a lock profile in the second mating portion,
   wherein the releasable lock mechanism comprises a piston moveable between a first position and second position to actuate the lock mechanism between a locked and released position;
   wherein the first cam profile comprises a first helical profile which terminates in a slot; and wherein the second cam profile comprises a second helical profile comprises a second helical profile which terminates in a key.

2. The latching assembly of claim 1, wherein the key is provided with a helical surface and the first helical profile rides on the helical surface until the key is received in the slot.

3. A latching assembly, comprising:
   a mandrel;
   a first mating portion rotatably coupled about the mandrel, the first mating portion comprising a first housing body with a bore for receiving the mandrel, the first housing body being coupled to the mandrel;
   a second mating portion comprising a second housing body with a bore which receives one end portion of the mandrel;
   a first cam member mounted on the first mating portion, the first cam member having a first cam profile; and
   a second cam member mounted on the second mating portion, the second cam member having a second cam profile adapted to inter-fit with the first cam profile;
   the first and second cam profiles being engageable to rotate the first and second cam members to enable inter-fitting of the first and second profiles;
   the mandrel having a slot that is adapted to rotationally interlock with a key in the second housing body.

4. The latching assembly of claim 3, wherein the first mating portion is rotationally restrained relative to the mandrel until a torque reaches a predetermined minimum torque.

5. The latching assembly of claim 3, further comprising a lock member mounted on the one end portion of the mandrel, the lock member being adapted to engage a lock profile in the second housing body when the cam profiles are inter-fitted.

6. The latching assembly of claim 5, further comprising a piston member disposed between the housing body and the mandrel, the piston member being movable between a position to engage the lock member with the lock profile and a position to release the lock member from the lock profile.

7. The latching assembly of claim 3, wherein the first cam profile comprises a first helical profile which terminates in a slot.

8. The latching assembly of claim 7, wherein the second cam profile comprises a second helical profile which terminates in a key.

9. The latching assembly of claim 8, wherein the key is provided with a helical surface and the first helical profile rides on the helical surface until the key is received in the slot.

10. The latching assembly of claim 1, wherein the lock mechanism further comprises a lock ring cooperable with the piston.

11. The latching assembly of claim 10, wherein the lock profile comprises a groove engageable by the lock ring.

* * * * *